(12) United States Patent (10) Patent No.: US 9,325,176 B2
Siri (45) Date of Patent: Apr. 26, 2016

(54) OPTIMUM POWER TRACKING FOR DISTRIBUTED POWER SOURCES

(75) Inventor: Kasemsan Siri, Torrance, CA (US)

(73) Assignee: The Aerospace Corporation, El Segundo, CA (US)

( * ) Notice: Subject to any disclaimer, the term of this patent is extended or adjusted under 35 U.S.C. 154(b) by 916 days.

(21) Appl. No.: 13/462,112

(22) Filed: May 2, 2012

(65) Prior Publication Data

US 2013/0293022 A1 Nov. 7, 2013

(51) Int. Cl.
*H02J 4/00* (2006.01)
*H02J 3/38* (2006.01)

(52) U.S. Cl.
CPC .............. *H02J 3/385* (2013.01); *Y02E 10/58* (2013.01); *Y10T 307/707* (2015.04)

(58) Field of Classification Search
CPC ....... H02J 3/385; Y02E 10/58; Y10T 307/707
USPC .......................................................... 307/46
See application file for complete search history.

(56) References Cited

U.S. PATENT DOCUMENTS

| | | |
|---|---|---|
| 6,009,000 A | 12/1999 | Siri |
| 6,281,485 B1 | 8/2001 | Siri |
| 6,369,462 B1 * | 4/2002 | Siri ........................... G05F 1/67 307/51 |
| 6,433,522 B1 | 8/2002 | Siri |
| 7,151,362 B1 | 12/2006 | Siri |
| 7,193,872 B2 | 3/2007 | Siri |
| 7,324,361 B2 | 1/2008 | Siri |
| 7,564,149 B2 | 7/2009 | Siri et al. |
| 7,773,395 B2 | 8/2010 | Siri |
| 7,863,766 B2 | 1/2011 | Abolhassani et al. |
| 7,964,991 B2 | 6/2011 | Siri |
| 8,013,472 B2 | 9/2011 | Adest et al. |
| 8,053,929 B2 | 11/2011 | Williams et al. |
| 8,068,352 B2 | 11/2011 | Yu et al. |
| 8,093,754 B2 | 1/2012 | Kernahan |
| 8,106,526 B2 | 1/2012 | Abolhassani et al. |
| 8,692,408 B2 * | 4/2014 | Zhang ................... H02M 5/458 307/12 |
| 8,872,384 B2 * | 10/2014 | Stratakos ................ H02J 3/383 307/104 |
| 2004/0212424 A1 * | 10/2004 | Allred ..................... H03B 29/00 327/551 |
| 2006/0017327 A1 | 1/2006 | Siri et al. |
| 2006/0097519 A1 * | 5/2006 | Steinke ................... F03D 9/005 290/44 |
| 2006/0171182 A1 | 8/2006 | Siri et al. |

(Continued)

OTHER PUBLICATIONS

Siri et al., "Current-Sharing/Voltage-Distribution Control for Interconnected DC-DC Converters," International Energy Conversion Engineering Conference, Jun. 25-27, 2007.
Siri et al., "Fault-Tolerant Scaleable Solar Power Bus Architectures with Maximum Power Tracking," The Applied Power Electronics Conference, pp. 1009-1014, Mar. 4-8, 2001.
Siri et al., "Independently Sourced Parallel-Connected Power Systems with Maximum Power Tracking," The Applied Power Electronics Conference, pp. 533-539, Feb. 9-13, 2003.

(Continued)

*Primary Examiner* — Hal Kaplan
*Assistant Examiner* — Elim Ortiz
(74) *Attorney, Agent, or Firm* — LeonardPatel PC

(57) ABSTRACT

Embodiments of the present invention provide an apparatus for optimum power tracking for distributed power sources. The apparatus includes a plurality of distributed-input parallel-output converters. Each converter is operably connected to a corresponding power source to form a power-processing channel. The apparatus also includes a controller operably connected to the plurality of converters, and is configured to provide uniform input voltages across each power source while tracking an optimum power point. The controller provides tolerance for multiple faults up to N−1 power source failures for the apparatus comprising an N-channel converter power system with N distributed power sources.

22 Claims, 19 Drawing Sheets

(56) References Cited

U.S. PATENT DOCUMENTS

| | | | |
|---|---|---|---|
| 2006/0273770 A1* | 12/2006 | Siri | H02M 3/157 323/272 |
| 2007/0159866 A1 | 7/2007 | Siri | |
| 2008/0143188 A1 | 6/2008 | Adest et al. | |
| 2008/0150366 A1 | 6/2008 | Adest et al. | |
| 2008/0197825 A1 | 8/2008 | Siri | |
| 2009/0206666 A1 | 8/2009 | Sella et al. | |
| 2009/0212568 A1* | 8/2009 | Maibach | F03D 9/002 290/44 |
| 2010/0133816 A1 | 6/2010 | Abolhassani et al. | |
| 2010/0157634 A1 | 6/2010 | Yu et al. | |
| 2010/0213767 A1 | 8/2010 | Siri | |
| 2010/0274401 A1 | 10/2010 | Kjaer et al. | |
| 2010/0295383 A1* | 11/2010 | Cummings | H01L 31/02021 307/151 |
| 2010/0301670 A1 | 12/2010 | Wilhelm | |
| 2010/0327666 A1 | 12/2010 | Abolhassani et al. | |
| 2011/0012364 A1 | 1/2011 | Abolhassani et al. | |
| 2011/0049994 A1* | 3/2011 | Hiller | F03D 9/002 307/82 |
| 2011/0077792 A1 | 3/2011 | Shimoda et al. | |
| 2011/0084553 A1* | 4/2011 | Adest | H02J 1/102 307/63 |
| 2011/0273015 A1 | 11/2011 | Adest et al. | |
| 2011/0273016 A1 | 11/2011 | Adest et al. | |
| 2011/0291486 A1 | 12/2011 | Adest et al. | |
| 2012/0068547 A1* | 3/2012 | Vermeersch | G05F 1/67 307/82 |
| 2013/0088081 A1* | 4/2013 | Siri | H02J 3/383 307/46 |
| 2013/0249319 A1* | 9/2013 | Cummings | H01L 31/02021 307/131 |

OTHER PUBLICATIONS

Siri et al., "Optimum Energy Harvesting among Distributed Power Sources with Uniform Voltage Distribution," IEEE, Mar. 5, 2012.

Siri et al., "Optimum Power Tracking among Series-Connected Power Sources with Uniform Voltage Distribution," IEEE, Mar. 7, 2011.

Siri et al., "Optimum Power Tracking among Series-Connected Power Sources with Uniform Voltage Distribution," Rangsit Journal of Arts and Sciences, vol. 1, No. 1, Jan.-Jun. 2011.

Siri et al., "Parallel-Connected Converters with Maximum Power Tracking," The Applied Power Electronics Conference, Mar. 10-14, 2002.

Siri et al., "Performance Limitations of Random Current-sharing Parallel-Connected Converter Systems and Their Solution," The Applied Power Electronics Conference, pp. 860-866, Feb. 15-19, 1998.

Siri et al., "Uniform Current-Sharing Control for Independently-Sourced Series-Input Connected Converters," International Energy Conversion Energy Conference, Jul. 28-30, 2008.

Siri et al., "Uniform Voltage Distribution Control for Paralleled-Input, Series-Output Connected Converters," IEEE, Mar. 2005.

Siri et al., "Uniform Voltage Distribution Control for Series Connected DC-DC Converters," IEEE Transactions on Power Electronics, vol. 22, pp. 1269-1279, Jul. 2007.

Siri et al., "Uniform Voltage Distribution Control for Series Connected DC-DC Converters," IEEE Transactions on Power Electronics, vol. 22, No. 4, Jul. 2007.

Siri et al., "Uniform Voltage Distribution Control for Series-Input Parallel-Output, Connected Converters," IEEE, Mar. 2006.

* cited by examiner

700

1200

1400

OPTIMUM POWER TRACKING FOR DISTRIBUTED POWER SOURCES

FIELD

The present invention generally relates to optimum power tracking, and more particularly, to optimum power tracking for distributed power sources.

BACKGROUND

There are certain issues that can arise in conventional power and control architectures that employ multiple solar arrays. First, distributed array voltages may fail to achieve uniform distribution when their array panels are not identical, such as their current-voltage (I-V) curves having approximately the same peak-power voltages that respectively deliver different peak-power ratings. Second, too many maximum power tracking (MPT) controllers may be employed dedicated to their respective array panels, leading to a high part count. Lastly, a simpler and common MPT controller may be lacking that tolerates at least a power source failure while the non-identical power sources are independently sourcing their powers to a power system consisting distributed power channels for processing their respective distributed power sources.

SUMMARY

Certain embodiments of the present invention may provide solutions to the problems and needs in the art that have not yet been fully identified, appreciated, or solved by conventional power and control architectures.

In accordance with an embodiment of the present invention, an apparatus is provided. The apparatus includes a plurality of distributed-input parallel-output (DIPO) converters and a controller. Each converter operably connected to a corresponding power source. The controller is operably connected to the plurality of converters, and is configured to provide uniform input voltages across each power source while tracking an optimum power point.

In another embodiment of the present invention, an apparatus is provided. The apparatus includes a system controller that can apply control voltages across each of a plurality of DIPO converters, such that uniform input voltage is achieved across each of a plurality of power sources.

In yet another embodiment of the present invention, a system controller is provided. The system controller includes a uniform voltage distribution controller that is configured to generate control voltages. The control voltages are applied across each of a plurality of DIPO converters such that uniform input voltage is achieved across each of a plurality of power sources.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
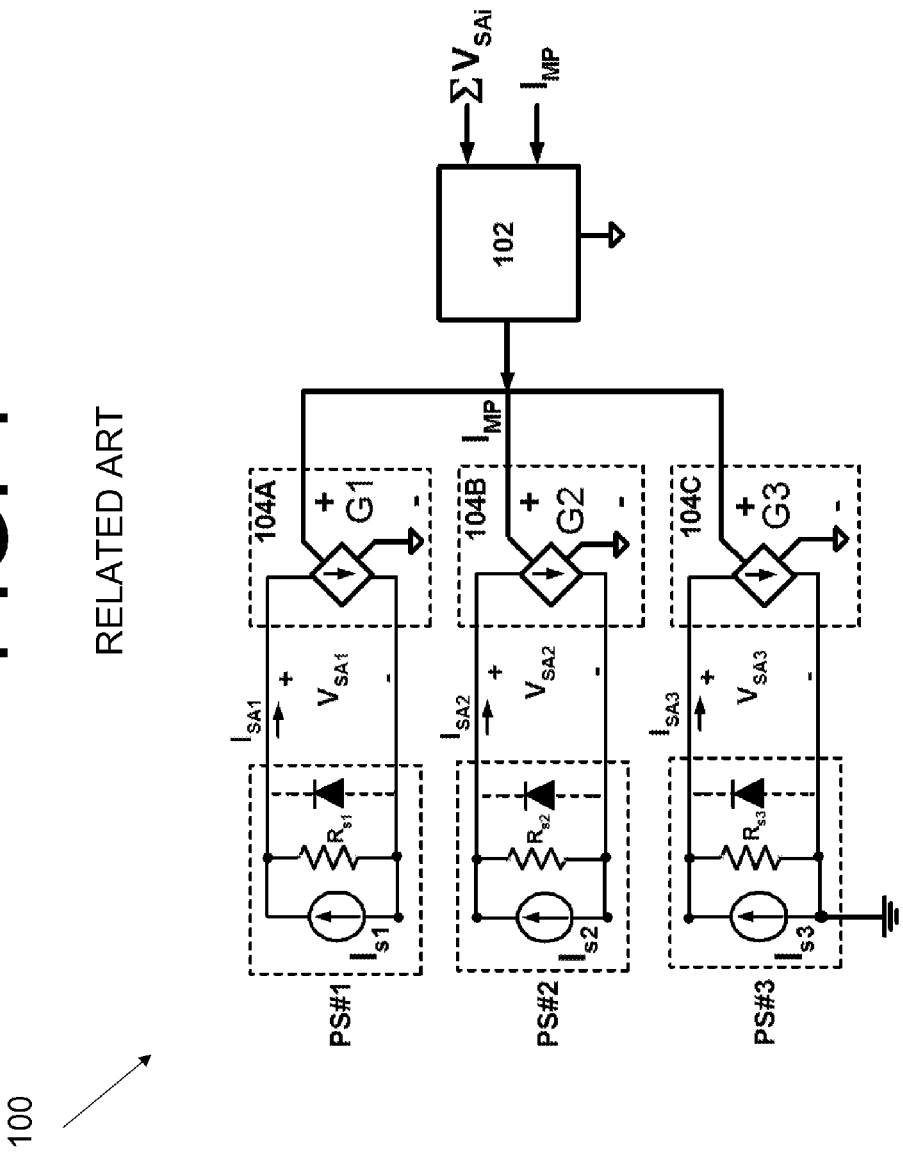
FIG. 1 illustrates a diagram for an energy harvesting approach with group tracking with uniform source-current distribution (GT-UCD).

It will be readily understood that the components of the invention, as generally described and illustrated in the figures herein, may be arranged and designed in a wide variety of different configurations. Thus, the following detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

Embodiments of the present invention provide a family of power system architectures such that DIPO converters are controlled to achieve uniform input voltages across their respective distributed power sources while also tracking the system optimum power point. The system optimum power point may be the maximum power drawn from the distributed power sources while their voltages are kept uniformly distributed. With uniform input voltage distribution control, near-maximum use of the power sources can be achieved by employing a single MPT controller instead of multiple IMPT controllers dedicated to each power source.

DIPO converters provide an interface between the distributed power sources and the regulated system BUS voltage so that the system BUS voltage becomes much less dependent on any of the distributed power sources. For example, if one power source is removed or fails, the system BUS voltage can still be regulated (e.g., maintained at a fixed target voltage) as long as the load demand is less than the available maximum power of the remaining functional sources. In other words, DIPO converters have a tolerance for multiple power source failures up to N−1 power sources for a system of N distributed power sources. DIPO converters also promote the system safety at their distributed inputs since the distributed power sources can be sized to have their voltages in a safe voltage range that is not dangerous to a human. Further, the power-return output of the distributed sources may all be at the same potential that can be tied to the system ground, making system maintenance and repair much easier and safer.

Many embodiments discussed herein ensure that all distributed power sources, particularly weak distributed power sources, serve as power providers and not power dissipaters. By equalizing voltages across all distributed power sources, that the combined I-V characteristics possess only one peak power point is ensured, rather than multiple localized peak power points as in conventional systems. Embodiments of the present invention further allow a reduction in system controller power complexity and part counts since a single streamlined MPT controller can be used instead of IMPT controllers dedicated to each power source. Certain embodiments of the present invention are also capable of delivering system peak power approaching the ideal peak power offered by conventional IMPT controllers while achieving exceptional tolerance of more than one power source failure. Further, embodiments of the present invention may allow for a simpler MPT algorithm that only requires a single feedback signal to process and search for peak-power voltage.

Distributed power sources, such as solar array panels of which power flows are individually processed through their respective DC-DC converters, have become practical for flexibility and reliability of DC power transmission from the sources to the loads that are commonly terminated across the system output. Currently, there are at least three possible approaches for drawing power from distributed power sources: (1) directly across each distributed power source as GT-UCD among distributed source currents (see FIG. 1); (2) directly across the distributed power sources with GT-UVD control of their sourcing voltages (see FIG. 2); and (3) directly across the individual power sources, with each power source possessing its own IMPT (see FIG. 3). However, each of these three approaches has limitations that are discussed below.

FIG. 1 illustrates a diagram 100 for an energy harvesting approach with GT-UCD. FIG. 1 illustrates a single MPT controller 102, converters 104A-C, and power sources PS#1, PS#2, and PS#3. Each power source PS#1, PS#2, and PS#3 is represented by a respective current source $I_{S1}$, $I_{S2}$, $I_{S3}$, a respective source resistor $R_{S1}$, $R_{S2}$, $R_{S3}$, as well as a respective diode $D_1$, $D_2$, $D_3$. Each converter 104A, 104B, and 104C is represented by a respective controlled current sink G1, G2, G3 that is controlled in common by the commanding peak-power current signal $I_{MP}$. The GT-UCD approach shown in FIG. 1 is not only inefficient, but also fails to fully utilize distributed power sources PS#1, PS#2, and PS#3, especially when power sources PS#1, PS#2, and PS#3 possess non-identical I-V characteristics.

Further, the delivered peak power from the GT-UCD approach in FIG. 1 is below the ideal available peak power when a power source becomes weak and acts as a power dissipater instead of a power provider. Weak solar panels may include a bypass diode across their two sourcing terminals to clamp their negative voltage to a minimum. However, power delivery can still fall significantly below the available peak power. In this embodiment, G1, G2, and G3 may be controlled current sinks, each of which can be realized as a DC-DC converter 104A, 104B, 104C that has its input current controlled to follow the commanding peak-power current signal $I_{MP}$.

Figure 2:
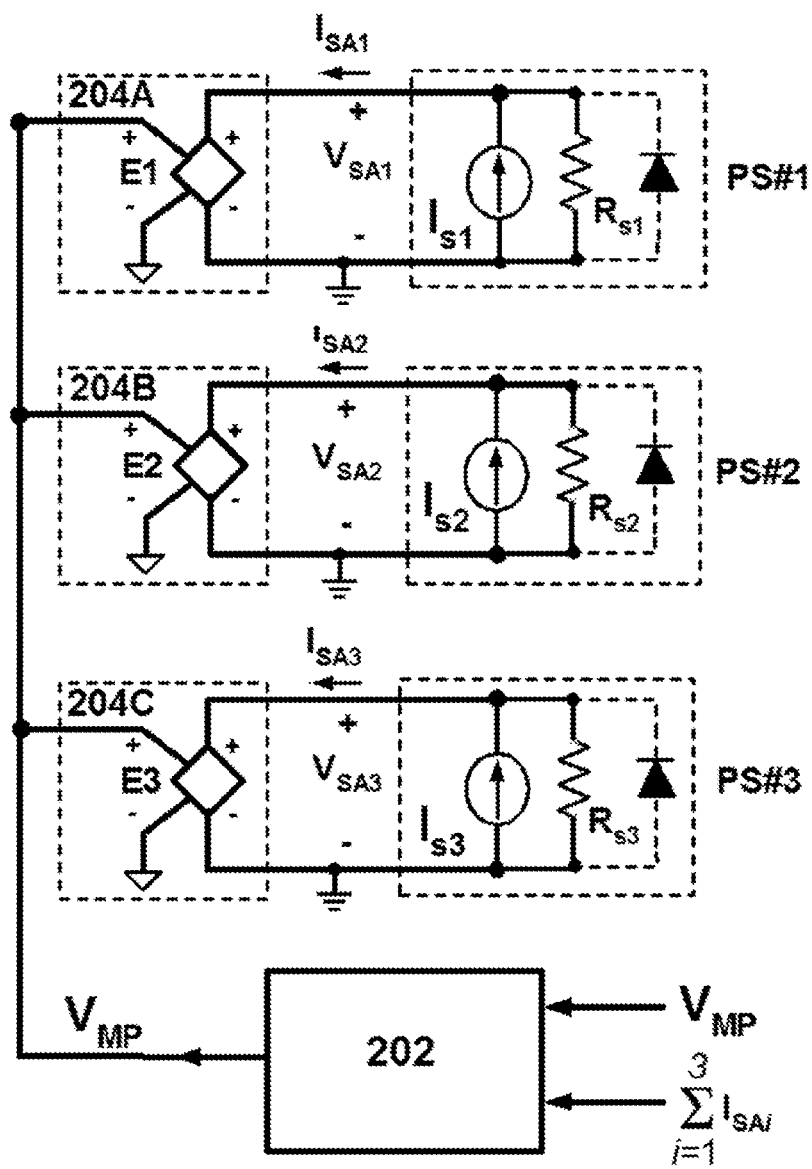
FIG. 2 illustrates a system diagram for an energy harvesting approach with group tracking with uniform voltage distribution (GT-UVD) control.

FIG. 2 illustrates a system diagram 200 for an energy harvesting approach with GT-UVD control. FIG. 2 illustrates a single MPT controller 202, converters 204A-C, and power sources PS#1, PS#2, and PS#3. In FIG. 2, the GT-UVD approach employs distributed DC-DC converters 204A-C, which are individually connected across their respective power sources PS#1, PS#2, and PS#3 to regulate their sourcing voltages $V_{SA1}$, $V_{SA2}$, $V_{SA3}$ to be uniformly distributed at all times. In most cases, the GT-UVD approach may result in a much higher delivered peak power when compared to that obtained by the GT-UCD approach. For example, when the maximum power point voltages $V_{MP}$ of the sources are similar, uniform distribution of the power source voltages ensures that they all become power providers.

Figure 3:
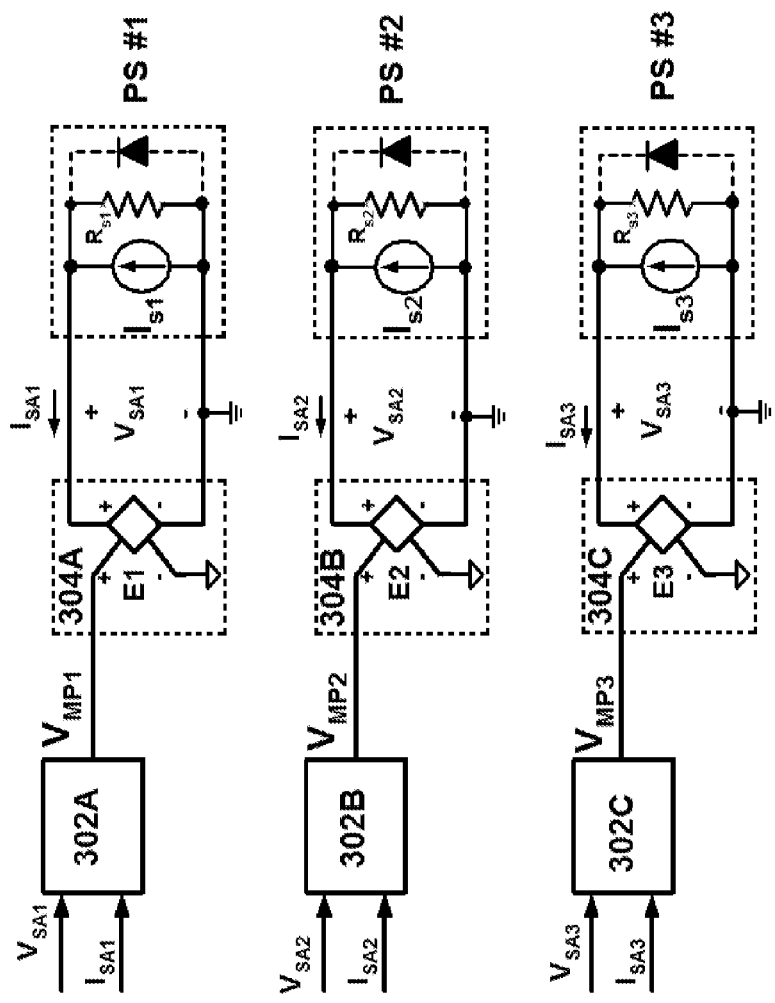
FIG. 3 illustrates a system diagram for an energy harvesting approach using independent maximum power tracking (IMPT) controllers.

For cases having input power sources with similar peak power voltages, the power delivered by the GT-UVD system approaches the ideal peak power obtained by the IMPT approach, as shown in FIG. 3. In FIG. 3, each power source PS#1, PS#2, and PS#3 possesses its own IMPT controller 302A, 302B, 302C, respectively. In this example, each MPT controller 302A, 302B, and 302C uses a respective converter 304A, 304B, 304C to track the maximum power for each respective power source PS#1, PS#2, and PS#3. The IMPT controller enables the ideal peak power to be obtainable as a summation of all available peak powers being extracted from all of the power sources in the system. However, the IMPT configuration shown in FIG. 3 increases complexity, and as a result, increases cost.

Figure 4:
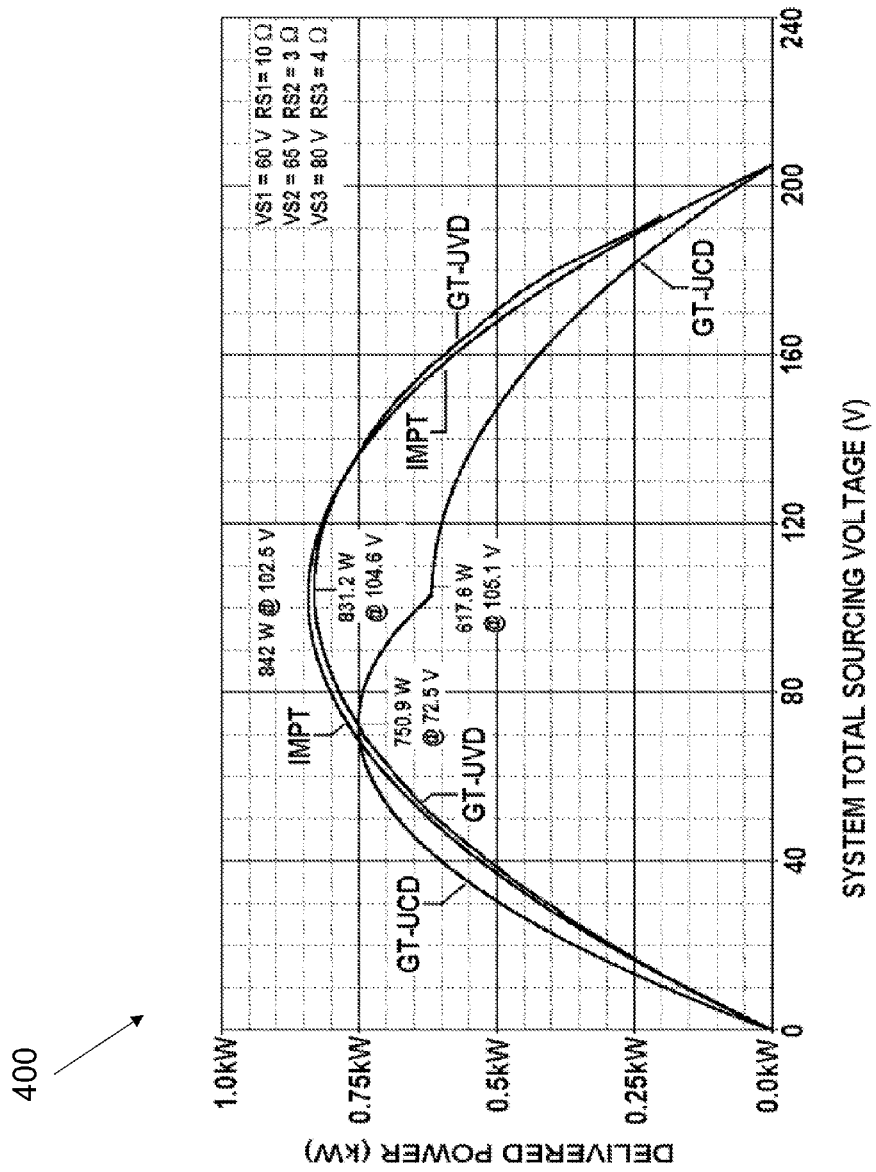
FIG. 4 shows delivered power as a function of the total sourcing voltage.

FIG. 4 shows the delivered power as a function of the total sourcing voltage that is the summation of all distributed voltages across the individual power sources. The three energy-harvesting approaches shown in FIGS. 1, 2, and 3 are analyzed through computer simulation using $I_{S1}$=6 A, $I_{S2}$=21.67 A, and $I_{S3}$=20 A with $R_{S1}$=10Ω, $R_{S2}$=3Ω, and $R_{S3}$=4Ω, respectively, representing power sources PS#1, PS#2, and PS#3.

The IMPT curve shown in FIG. 4 provides the delivered power when IMPT controllers are distributed to their respective power sources, revealing the highest peak power that is achievable. The delivered power shown in the GT-UVD curve is obtained by the MPT controller of FIG. 2. The MPT controller actively regulates all of the source voltages to be identical. In this example, the delivered peak power through the GT-UVD control (831.2 W) is only 1.23% off from the ideal peak power obtained by the IMPT control (842 W).

The delivered power shown in the GT-UCD curve is accomplished by the GT-UCD approach shown in FIG. 1. In the GT-UCD approach, the three non-identical power sources are terminated with their respective bypassing diodes, equivalently representing three solar array panels that are exposed to different solar illuminations, i.e., due to non-uniform shading or different array-tilting angles facing the sun. However, in this example, the GT-UCD approach can only deliver 750.9 W as its peak power is too far from the ideal system peak power of 842 W, leading to an unattractive tracking efficiency of 89.1%. Consequently, the three P-V characteristics labeled as IMPT, GT-UVD, and GT-UCD in FIG. 4 serve as comparable examples to recognize potential merits of GT-UVD control.

The GT-UVD approach for distributed power sources results in an economical and simple energy harvesting method through the use of a single MPT controller that can be managed to blend with the existing power and control architectures, whether system outputs are regulated-voltage buses or battery-dominated buses. The embodiments of the present invention described below improve the efficiency of the GT-UVD approach shown in FIG. 2 and offer near-maximum power transfer with reduced complexity.

Figure 5:
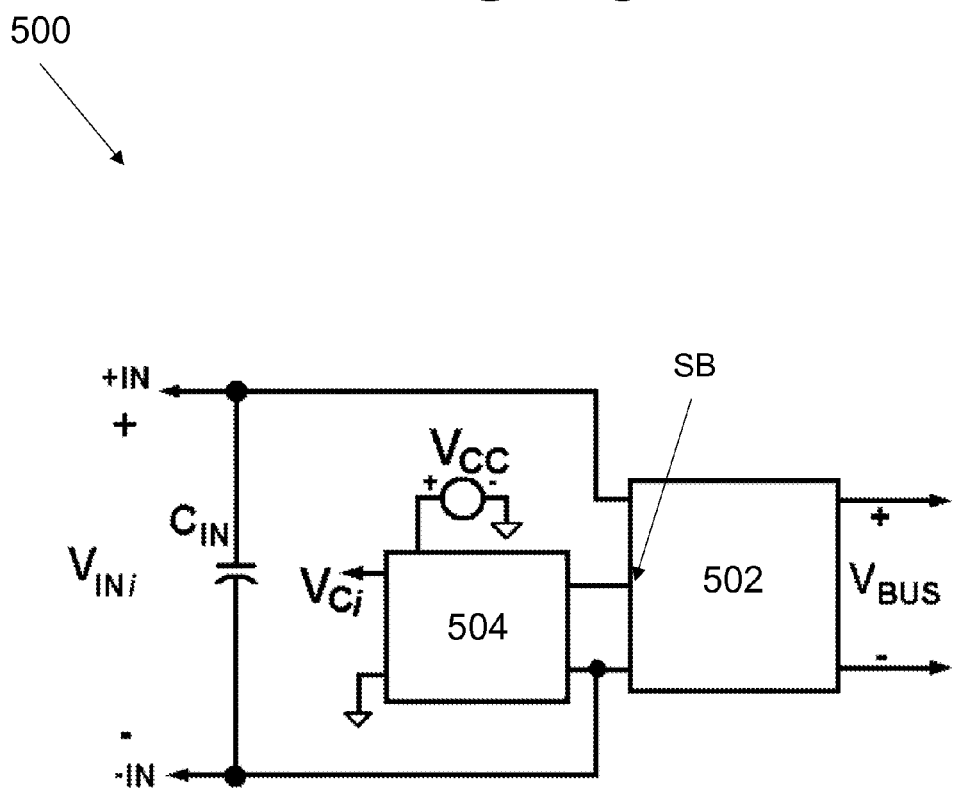
FIG. 5 illustrates a DC-DC converter.

FIG. 5 illustrates a DC-DC converter 500 with an opto-isolated control input $V_{Ci}$, which is electrically isolated from the input power and return terminals of the converter. In FIG. 5, an output-isolated DC-DC converter 502 with an OPTO coupler circuit 504 is configured to provide electrical isolation to control the power flow of the converter using control input $V_{Ci}$. Many isolated-control converters can have their input power ports individually connected to their respective power sources while the converters are independently controllable through their respective control inputs $V_{Ci}$ and their outputs may be connected in parallel for power delivery to a shared load. In general, each converter's input-power return-IN and the system controller's reference ground may not have the same operating voltage or may not be the same electrical node. Thus, output-isolated DC-DC converter 502 with OPTO coupler circuit 504 provides flexibilities for interconnection among many converters such that their input power returns do not need to be tied together to the reference ground of the system controller. A voltage at the common collector $V_{CC}$ is utilized to bias a voltage signal of OPTO coupler circuit 504. An input-filter capacitor $C_{IN}$ of sufficient capacitance is terminated across each converter input for achieving an acceptable AC input-ripple voltage, particularly when the converter input voltage is controlled to meet a certain control objective.

Output-isolated DC-DC converter 502 shown in FIG. 5 can be a single converter power stage or a group of converter power stages that are connected in parallel. These parallel-connected converter power stages of a current-mode type may be preferred. The current-mode converter power stages allow for a common shared-bus SB voltage signal to command the converter power stages in unison to achieve uniform current sharing, and at the same time serve other control objectives.

Figure 6:
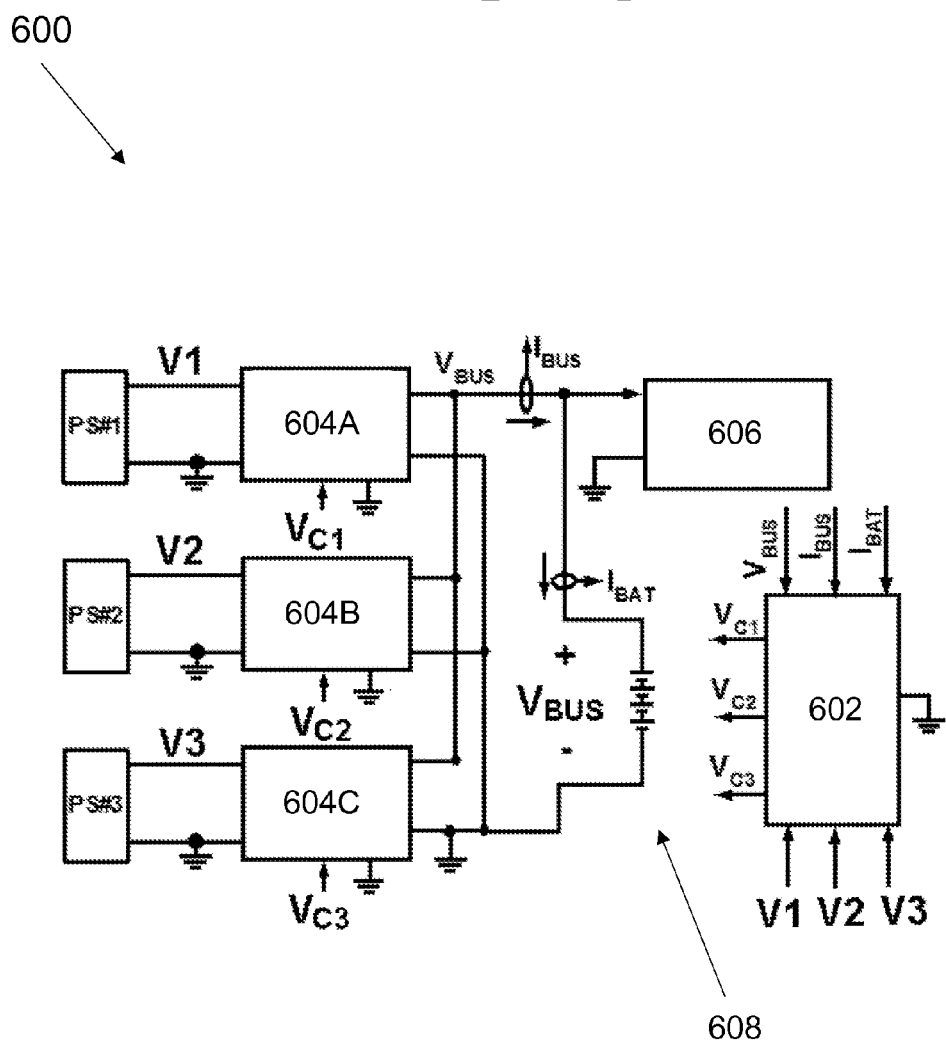
FIG. 6 illustrates a battery dominated power system 600, according to an embodiment of the present invention.

FIG. 6 illustrates a battery dominated power system 600, according to an embodiment of the present invention. In battery dominated power system 600, a common bus is connected to a battery bank 608. To that end, FIG. 6 illustrates a DIPO converter power system architecture that utilizes three DIPO converters 604A, 604B, 604C with their outputs being connected in parallel across battery bank 608 having an output voltage $V_{Bus}$. It should be appreciated that the number of converters may depend on the number of power sources in the system.

In a battery dominated power system 600, the amount of current $I_{BAT}$ to charge battery bank 608 at the optimum rate is controlled using the configuration shown in FIG. 6. For example, system controller 602 is configured to provide uniform input voltages across each power source PS#1, PS#2, and PS#3 while tracking an optimum power point for each power source so that $I_{BAT}$ is as high as possible whenever $I_{BAT}$ fails to reach its preset commanding charge-current.

A system load 606 may be terminated across the output voltage that becomes a battery-dominated voltage bus. A bus stabilizer network may be terminated across the system output voltage $V_{BUS}$ located as close to the system output port as possible to damp out AC energy, thus ensuring system stability. Each of converters 604A, 604B, 604C may share the following attributes: (1) a shared-bus control input SBi, which allows an external signal to take control of the converter power stage; (2) a number of parallel-connected converter modules configured with shared-bus control inputs tied together to form a common shared-bus control port to achieve nearly uniform current-sharing; (3) operate in a standalone configuration such that the output is regulated at a pre-determined voltage and its shared-bus input is left unconnected; and (4) provide electrical isolation between input and output. Therefore, the output-isolated converter 500 shown in FIG. 5 is represented by each of converters 604A, 604B, 604C shown in FIG. 6.

In this embodiment, system controller 602 includes six feedback input signals, e.g., battery bus voltage signal $V_{BUS}$, system bus current signal $I_{BUS}$, battery bank current signal $I_{BAT}$, and distributed input voltages V1, V2, and V3. Each input voltage V1, V2, V3 corresponds to a respective converter 604A, 604B, and 604C. Voltages V1, V2, and V3 provide system controller 602 with the voltage from the power sources PS#1, PS#2, and PS#3. Based on the six feedback input signals, system controller 602 may track power of each power source and may transmit control voltage signals $V_{C1}$, $V_{C2}$, and $V_{C3}$ to each power source PS#1, PS#2, and PS#3 to ensure peak performance of each power source. For example, based on the input signals, system controller 602 may detect when any of power sources PS#1, PS#2, and PS#3 are experiencing a reduction in power. To ensure that each of power sources PS#1, PS#2, and PS#3 act as a power provider and not a dissipater, system controller 602 transmits a voltage control signal to either all of the converters or the converter that is connected to the power source that is experiencing a reduction in power.

Figure 7:
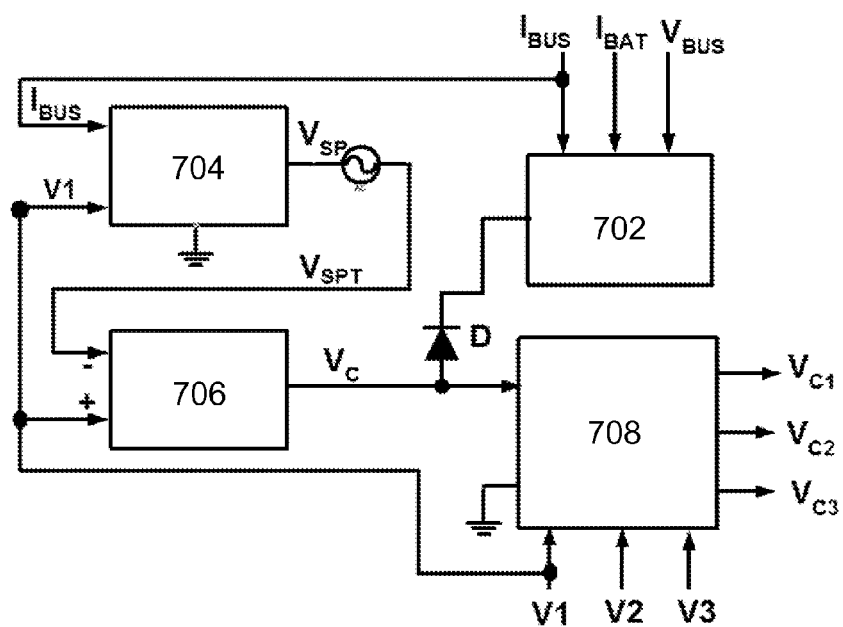
FIG. 7 illustrates a system controller, according to an embodiment of the present invention.

FIG. 7 illustrates a system controller 700, according to an embodiment of the present invention. It should be appreciated that system controller 700 shown in FIG. 7 may be employed in battery dominated power system 600 of FIG. 6 in some embodiments.

In this embodiment, system controller 700 provides four basic control functions. First, system controller 700 can control the system battery charge via a battery charge controller 702. Second, system controller 700 can perform system distributed input-voltage regulation via an input voltage regulator 706. Next, system controller 700 can perform uniform input voltage distribution via a UIVD controller 708. Finally, system controller 700 can perform system maximum power tracking via MPT controller 704.

In this embodiment, battery charge controller 702 is configured to regulate battery bus voltage signal $V_{BUS}$ to a preset value in accordance with its voltage-temperature (V/T) profile to prevent a battery or battery bank, such as the one shown in FIG. 6, from overcharging. When the battery bus voltage signal $V_{BUS}$ falls below a preset value that is pre-assigned as a function of temperature, the battery-bank current signal $I_{BAT}$ may be regulated at a preset charge-current set-point determined by battery charge controller 702. Active battery regulation of either battery bus voltage signal $V_{BUS}$ or battery bank current signal $I_{BAT}$ causes a forward-voltage bias across pull-down diode D.

When battery bus voltage signal $V_{BUS}$ and battery bank current signal $I_{BAT}$ are respectively below the preset voltage value and the preset charge-current set-point, system controller 700 may regulate the system distributed-input voltage V1 at the optimum peak power voltage that is determined by MPT controller 704. For example, MPT controller 704 may receive a system bus current signal $I_{BUS}$ and an optimum peak power voltage V1 to generate a commanding set point voltage signal $V_{SPT}$ that includes a set point reference voltage signal $V_{SP}$.

It should be appreciated that as long as the operating battery bus voltage signal $V_{BUS}$ and battery bank current signal $I_{BAT}$ are below their preset voltage/charge-current values, the DIPO converter power system shown in FIG. 6 is controlled to have an optimum power transfer from all distributed power sources by utilizing a single MPT controller 704 and an input-voltage regulation controller 706 that dominates its control over the battery charge controller 702 through a primary control voltage signal $V_C$ and the reverse-biased diode D.

During an active control by any of the three operational modes, e.g., battery voltage regulation for compliance with a V/T profile, battery charge-current regulation for serving a commanding charge rate, or distributed-input voltage regulation for tracking a system optimum-power voltage, uniform voltage distribution among converter-input voltages delivered by all distributed power sources is actively regulated at all times by UIVD controller 708. UIVD controller 708 is configured to properly distribute, in this embodiment, three voltage control signals $V_{C1}$, $V_{C2}$, and $V_{C3}$ to their respective isolated-control converters during this stage. In other embodiments, depending on the number of power sources and converters, UIVD controller 708 can distribute any number of voltage control signals $V_{Ci}$.

Figure 8:
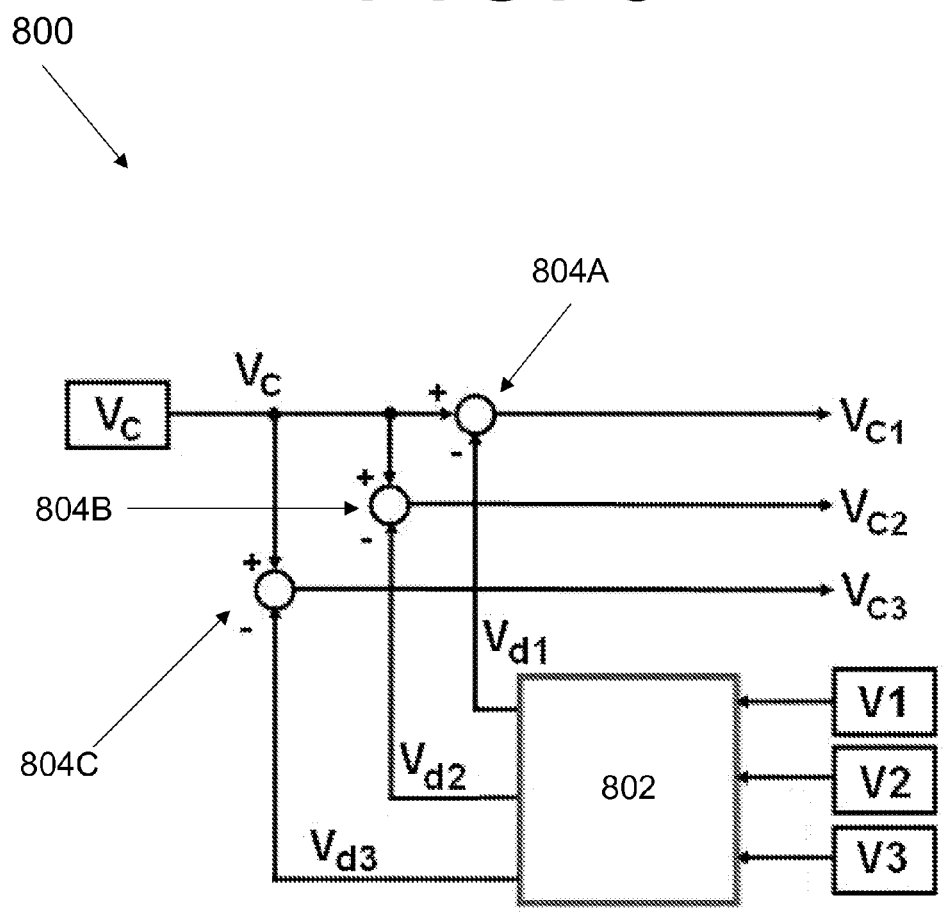
FIG. 8 illustrates a uniform input voltage distribution (UIVD) controller for three series connected converters, according to an embodiment of the present invention.

FIG. 8 illustrates a UIVD controller 800 for three distributed-input converters, according to an embodiment of the present invention. It should be appreciated that a DIPO power system may include N isolated-control DC-DC converters with their respective N distributed power sources PS#1, PS#2, . . . , PS#N.

During battery voltage and/or current regulation, or during the distributed input voltage regulation, input voltage distribution controller 802 may produce secondary voltage control signals ($V_{d1}, V_{d2}, \ldots, V_{dN}$). The number of secondary voltage control signals depends upon the number of converters in the DIPO power system. In this embodiment, controller 802 produces or generates three secondary voltage control signals $V_{d1}, V_{d2}, V_{d3}$ based on at least voltage signals V1, V2, V3. Determination of secondary voltage control signals $V_{d1}, V_{d2}, V_{d3}$ is discussed with respect to FIGS. 9 and 10. Secondary voltage control signals $V_{d1}, V_{d2}, V_{d3}$ may be subtracted from the voltage control signal $V_C$ at nodes 804A, 804B, and 804C to create a modified control voltages $V_{C1}, V_{C2}, V_{C3}$ to regulate the respective converter to accomplish uniform input voltage distribution.

Figure 9:
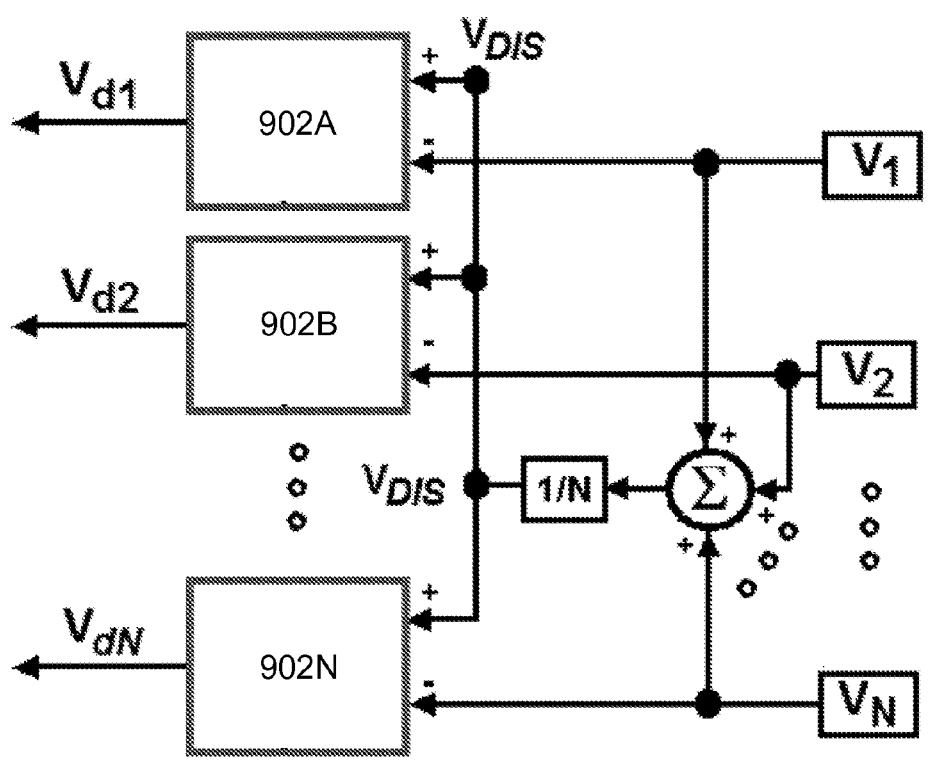
FIG. 9 illustrates a central-limit UIVD controller, according to an embodiment of the present invention.

FIG. 9 illustrates a central-limit UIVD controller 900, according to an embodiment of the present invention. In FIG. 9, a common distributed voltage reference signal $V_{DIS}=V_1/N$ may be generated as a central-limit (CL) distribution reference. In this case, N=3 for the number of distributed converters, but N may change based on the number of distributed converters.

Each voltage distribution error amplifier 902A-C is configured to amplify the voltage difference between a common distributed voltage reference signal $V_{DIS}$ and each converter-input voltage $V_1$, $V_2$, $V_3$. Each voltage distribution error amplifier 902A-C is further configured to compensate for the frequency and generate a secondary voltage control signal ($V_{d1}, V_{d2}, V_{d3}$) for each converter. Each secondary control signal $V_{di}$ is configured to provide a minor control correction to voltage control signal $V_C$, thus ensuring uniform input voltage distribution.

However, it should be appreciated that UIVD controller 900 may not be fault-tolerant when the common distributed voltage reference signal $V_{DIS}=V_1/N$ is the central-limit (CL) distribution reference. For example, if a single converter fails and cannot be controlled due to a short circuit across its input, the system may lose regulation.

Figure 10:
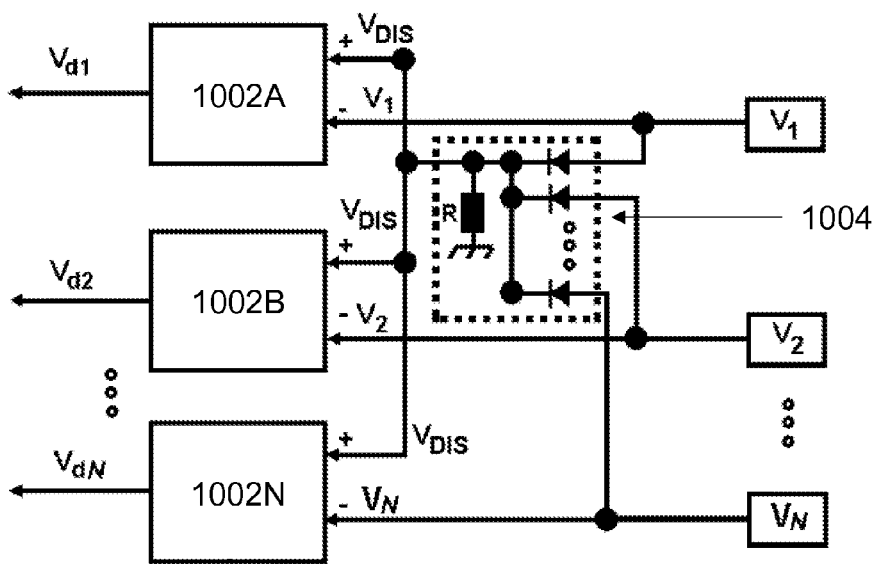
FIG. 10 illustrates a fault-tolerant UIVD controller using a Maximum-Limit (ML) distribution reference, according to an embodiment of the present invention.

To overcome such issues, FIG. 10 illustrates a fault-tolerant UIVD controller 1000 using a maximum limit (ML) distribution reference, according to an embodiment of the present invention. For example, FIG. 10 shows a UIVD controller 1000, having voltage distribution error amplifiers 1002A-N that are based on the ML distribution reference $V_{DIS}=\text{MAX}(V_1, V_2, \ldots, V_N)$. To achieve fault-tolerance, a set of ideal rectifiers 1004 is included as part of UIVD controller 1000 to produce a common distributed voltage reference signal $V_{DIS}$, which is the highest converter-input voltage obtained from one of the distributed converters within the power system. In other words, $V_{DIS}$ is the maximum limit selection candidate. $V_{DIS}$ corresponds to the sourcing input voltage of the strongest power source among N distributed power sources, wherein the strongest power source provides the highest power among distributed powers delivered by the N power sources.

Using such a configuration, if a converter fails due to an input short circuit, common distributed voltage reference signal $V_{DIS}$ may be automatically updated to compensate for the loss of a failed converter or the failure of its respective input power source. For the system to tolerate at least one converter input short-circuit failure, two ideal rectifiers may be required to sense the output voltage from any two converters. Up to N ideal rectifiers may be included in the UIVD controller 1000 for an N-converter DIPO system for tolerance up to N−1 power source failures.

In this embodiment, FIG. 10 illustrates UIVD controller 1000 for a three-converter DIPO power system with fault-tolerance. A common distributed voltage reference signal $V_{DIS}$ may be derived from N cathode-parallel-connected ideal rectifiers 1004 so as to individually sense the input voltages of converters, e.g., converters 604A, 604B, and 604C of FIG. 6. For example, if one converter fails to build up its input voltage, the N−1 remaining converters will be controlled to have uniform input voltage distribution.

Furthermore, the dc gain for each voltage distribution error amplifier 1002A, 1002B, . . . , 1002N does not need to be too high in order to achieve uniform input voltage distribution. To the contrary, insufficient dc gain within each distribution error amplifier 1002A, 1002B, . . . , 1002N causes UIVD controller 1000 to fail to provide uniform voltage distribution, particularly among power sources of significantly different peak-power ratings despite their similar peak-power voltages.

Figure 11:
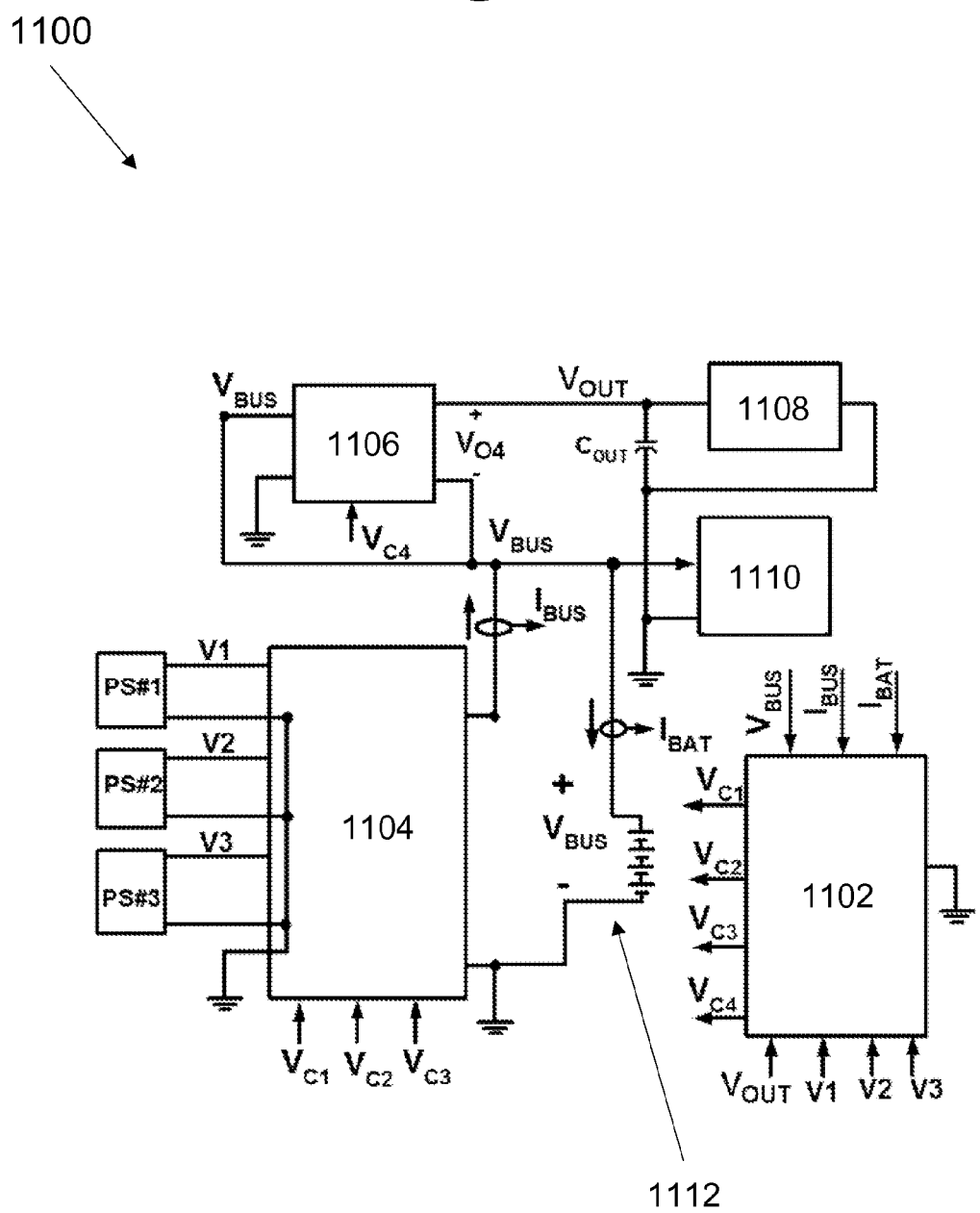
FIG. 11 illustrates dual-regulated bus power system with UIVD control, according to an embodiment of the present invention.

FIG. 11 illustrates dual-regulated bus power system 1100 with UIVD control, according to an embodiment of the present invention. In this embodiment, dual-regulated bus power system 1100 includes a 3-channel DIPO converter power system 1104. 3-channel DIPO converter power system 1104 includes three independently sourced input converters (not shown), each converter having outputs that are connected in parallel across a battery bank 1112. Battery bank 1112 has a battery bus output voltage $V_{BUS}$. A system load 1110 may be terminated across output voltage $V_{BUS}$ to become a battery dominated voltage bus.

Bus load 1108 may be terminated across a regulated bus voltage $V_{OUT}$. Bus load 1108 may be a single load or a group of load circuits that can share the same bus voltage signal $V_{OUT}$. Load characteristics may include a resistive load, a constant current-sink, a constant-power load, or a combination of one or more load types. As long as Bus load 1108 is compatible with a regulated bus sourcing impedance, that is, the sourcing impedance exhibits a lower magnitude than a load impedance, a closed loop control for regulated bus voltage $V_{OUT}$ can robustly regulate bus voltage signal $V_{OUT}$ without any instability. Since bus load 1108 may include various load types that may require tight voltage regulation, regulated bus voltage signal $V_{OUT}$ enables more types of load to draw power off of bus load 1108.

Each independently sourced input converter may share the same four attributes as previously described in relation to FIG. 6. In this embodiment, however, system controller 1102 has seven feedback input signals: a battery bus voltage signal $V_{BUS}$, regulated bus output voltage signal $V_{OUT}$, a system battery bus current signal $I_{BUS}$, a charging battery bank current signal $I_{BAT}$, and distributed input voltages V1, V2, and V3 from the three independently sourced input converters. System controller 1102 can provide at least five control functions. First, system controller 1102 can provide system voltage regulation of bus output voltage signal $V_{OUT}$. Second, system controller 1102 can provide battery charge control. System controller 1102 can also provide system distributed-input voltage regulation, as well as uniform input voltage distribution. Finally, system controller 1102 can provide system maximum power tracking.

A bus stabilizer network may be terminated across the regulated bus output voltage signal $V_{OUT}$ located as close to the system output port as possible to damp out AC energy, thus ensuring system stability. Regulated bus output voltage signal $V_{OUT}$ is on a closed-loop and controlled by an output isolated DC-DC converter 1106 with its output port $V_{O4}$ that is series-connected with battery bus voltage $V_{BUS}$. The output-series-connected converter significantly improves the system efficiency since output voltage signal $V_{O4}$ can be a minor portion of the overall output voltage signal $V_{OUT}$ and battery voltage signal $V_{BUS}$ can be the major portion. Voltage control signal $V_{O4}$ may drive the power stage of output isolated DC-DC converter 1106 to regulate the output voltage $V_{OUT}$ at a fixed value above the system battery-bus voltage $V_{BUS}$.

Figure 12:
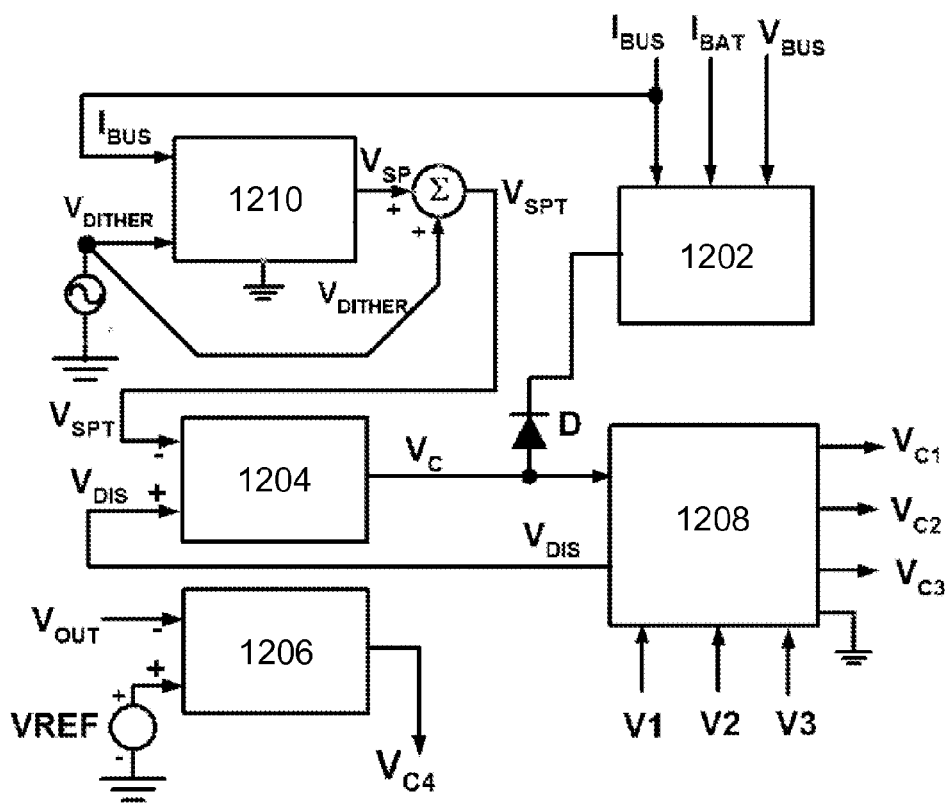
FIG. 12 illustrates a system controller for the dual regulated bus power system shown in FIG. 11, according to an embodiment of the present invention.

FIG. 12 illustrates a system controller 1200 for dual-regulated bus power system 1100 shown in FIG. 11, according to an embodiment of the present invention. System controller 1200 shown in FIG. 12 generally provides a more fault-tolerant coverage than system controller 700 shown in FIG. 7. In this embodiment, MPT controller 1210 receives a system battery bus current signal $I_{BUS}$ and a dither voltage signal $V_{DITHER}$ and generates a set point reference voltage signal $V_{SP}$. In this embodiment, the summation of the dither voltage signal $V_{DITHER}$ and set point reference signal $V_{SP}$ may generate a commanding set point voltage signal $V_{SPT}$ for regulation of the common distributed voltage reference signal $V_{DIS}$.

Unlike FIG. 7, input voltage regulator 1204 receives a common distributed voltage reference signal $V_{DIS}$ as its feedback input instead of voltage V1 from PS#1. Since common distributed voltage reference signal $V_{DIS}$ is the maximum-limit voltage, i.e., the maximum voltage detected from power sources or $V_{DIS}$=MAX(V1, V2, ..., VN), input voltage regulator 1204 can provide an active control on the common distributed voltage reference signal $V_{DIS}$ to follow a commanding set point voltage $V_{SPT}$. In this embodiment, there will always be an input voltage from one converter that is the highest among all the distributed-input voltages while they are controlled to have a uniform distribution at all times. This maximum-limit input voltage regulation allows the converter power system to tolerate more than one failure due to short-circuit or open-circuit of power sources, as well as short-circuit or overload across distributed inputs of DIPO converters.

Also, in this embodiment, system control 1200 includes an output voltage regulator 1206 that generates a control voltage signal $V_{C4}$ to be transmitted to an output isolated DC-DC converter 1106 shown in FIG. 11. The control voltage signal $V_{C4}$ helps to regulate system output voltage signal $V_{OUT}$. Control voltage $V_{C4}$ is the amplified frequency-compensated error signal that is proportional to the difference between reference voltage signal $V_{REF}$ and system output voltage $V_{OUT}$. As control voltage signal $V_{C4}$ increases, output isolated DC-DC converter 1106 absorbs more input current drawn from the battery voltage signal $V_{BUS}$ to provide sufficient output voltage $V_{O4}$ so that system output voltage signal $V_{OUT}$ is tightly regulated to the target value corresponding to the voltage reference signal $V_{REF}$. In this manner, output voltage regulator 1206 can be an OP-AMP analog circuit that serves as an error-voltage amplifier that accepts two inputs, system output voltage signal $V_{OUT}$ and voltage reference signal $V_{REF}$, and delivers one output control voltage signal $V_{C4}$.

Figure 13:
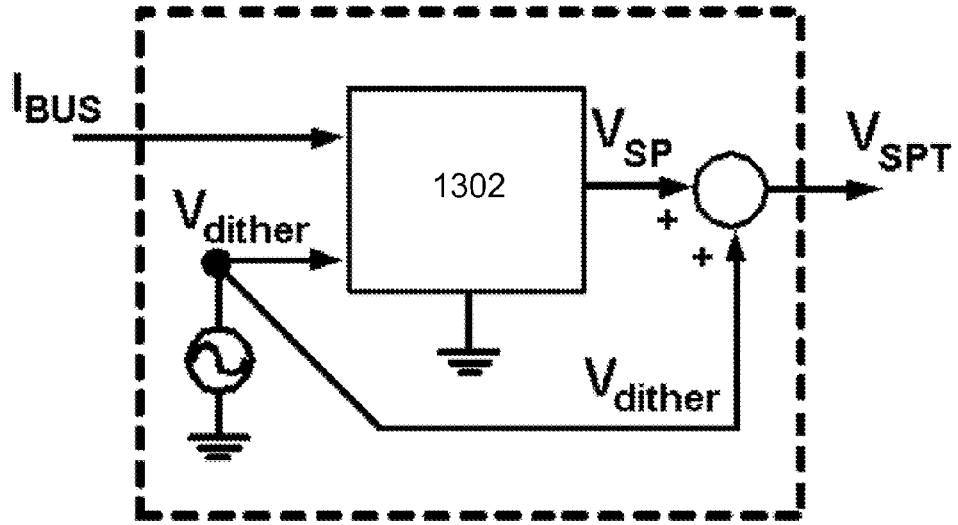
FIG. 13 illustrates a streamlined MPT controller, according to an embodiment of the present invention.

FIG. 13 illustrates a streamlined MPT controller 1300, according to an embodiment of the present invention. In this embodiment, MPT processing circuit 1302 receives and processes two signals—total system battery bus current signal $I_{BUS}$ and AC dither signal $V_{DITHER}$ having a low frequency. MPT processing circuit 1302 generates a commanding set point voltage signal $V_{SPT}$ that includes a set point reference voltage signal $_{VSP}$ and the AC dither signal $V_{DITHER}$. It should be appreciated that streamlined MPT controller 1300 has a single feedback input, e.g., the total system battery bus current signal $I_{BUS}$. This embodiment does not require additional feedback inputs, such as a feedback input for voltage V1.

Figure 14:
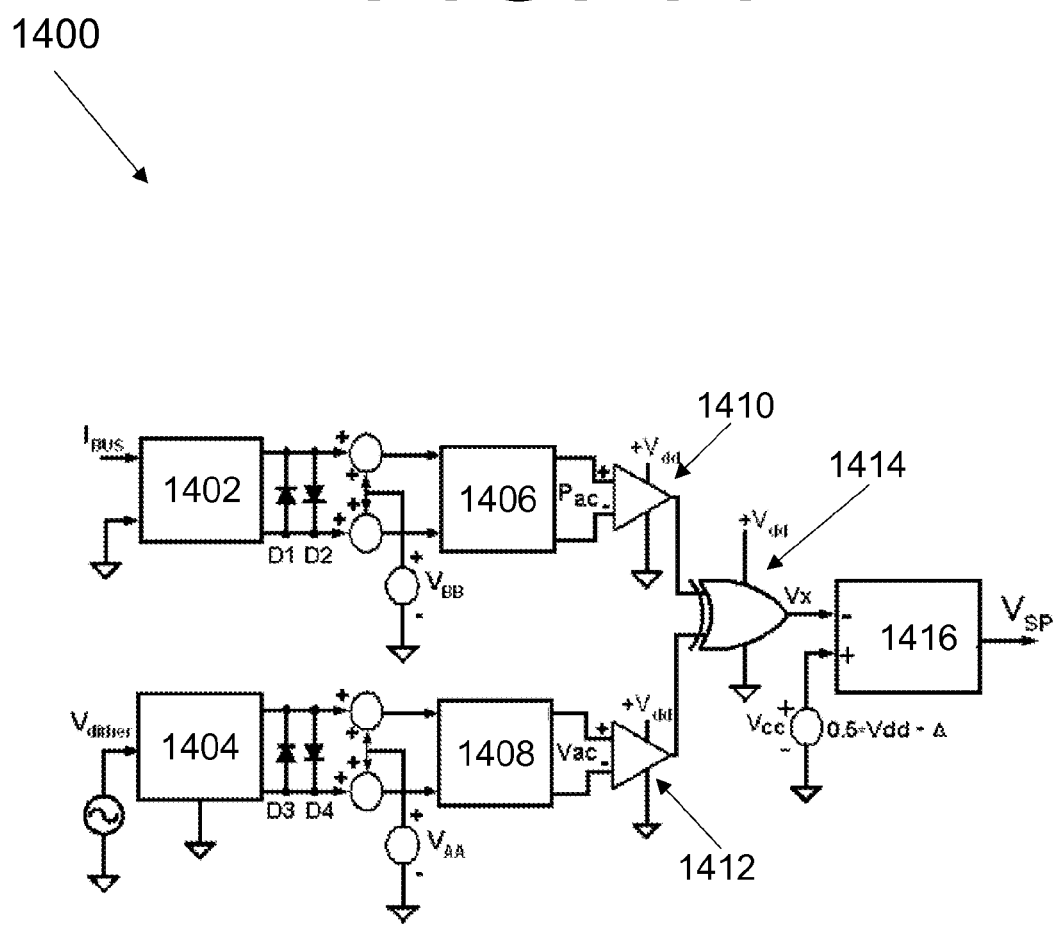
FIG. 14 illustrates a block diagram of the MPT processing controller shown in FIG. 13, according to an embodiment of the present invention.

FIG. 14 illustrates a block diagram 1400 of MPT processing circuit 1302 shown in FIG. 13, according to an embodiment of the present invention. The main feedback signal for MPT processing circuit 1302 is the total system battery current signal $I_{BUS}$ of the entire converter power system that is controlled to provide a maximum output current. Front-end differential-mode high-pass filter (HPF) 1402 removes the DC content from the total system battery current signal $I_{BUS}$ and provides a differential-mode AC output signal across voltage-limiting diodes D1 and D2. The high-pass-filtered AC current signal is then biased with a common-mode voltage and a low-pass filter (LPF) 1406 to remove high-frequency noise. In this manner, cascaded differential-mode HPF 1402 and LPF 1406 stages produce a band-limited AC power signal $P_{ac}$ that is proportional to the incremental power delivered by the solar array source. Subsequently, a voltage comparator circuit 1410 converts $P_{ac}$ into a logical voltage signal.

Simultaneously, in a parallel path, differential-mode HPF 1404 and LPF 1408 stages extract an AC voltage signal $V_{ac}$ from the dither voltage signal $V_{DITHER}$ that is also converted into another logical voltage signal through voltage comparator circuit 1412. The filtered AC dither signal $V_{ac}$ may be in-phase with the solar array dither voltage. Incremental power signal $P_{ac}$ and AC dither voltage signal $V_{ac}$ may be processed through an exclusive-OR (XOR) gate 1414 to decode their phase relationship $V_x$. Depending on the phase shift between the power signal $P_{ac}$ and dither voltage signal $V_{ac}$ the DC value of voltage signal $V_x$ may drift from its idle DC value, usually set to 50 percent of the supplying voltage to XOR gate 1414. The deviation of voltage signal's $V_x$ average voltage from its idle DC value can cause the downstream voltage integrator circuit 1416 to slowly update the set point reference output signal $V_{SP}$ toward a value corresponding to the peak-power voltage $V_{mp}$ of the solar array.

To ensure a proper idle state of MPT processing circuit 1302, the reference voltage feeding the positive input of voltage integrator 1416 may be slightly reduced by a small value Δ, such that the idle state of the set point reference voltage signal $V_{SP}$ corresponds to the array voltage just below the array peak-power voltage. This causes the streamlined MPT controller 1300 to stay in an idle state and be triggered for active maximum power tracking when the solar array voltage reduces to the idle set point voltage $V_{SPMIN}$.

Figure 15:
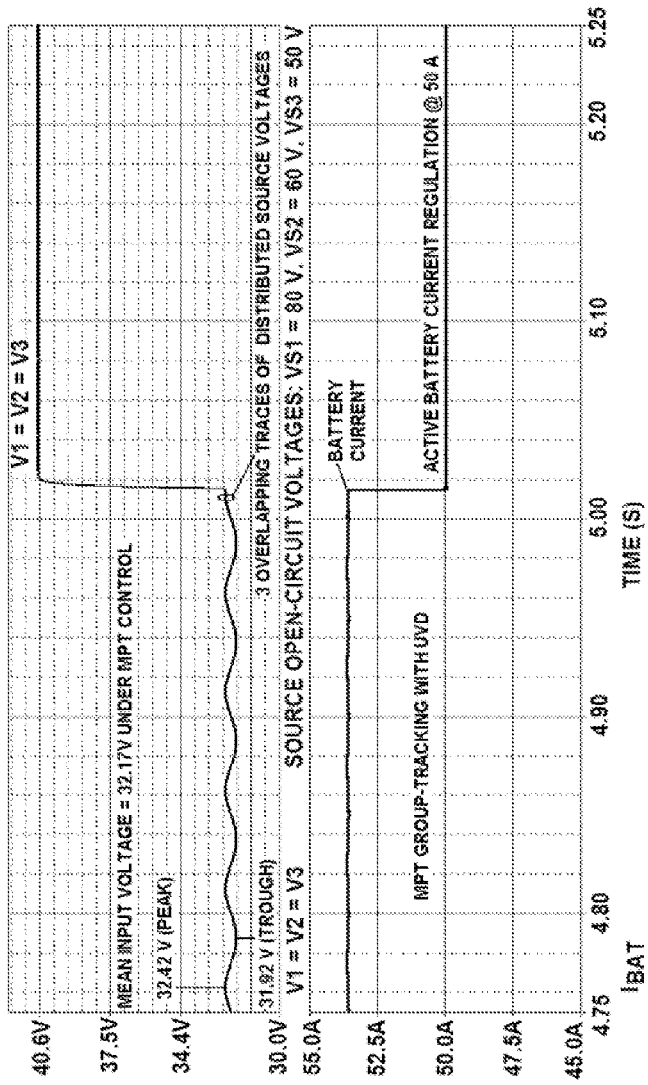
FIG. 15 illustrates a graph for a simulated response of the battery dominated power system shown in FIG. 6, according to an embodiment of the present invention.

FIG. 15 illustrates a graph 1500 for a simulated response of battery dominated power system 600 shown in FIG. 6 during both input voltage regulation with GT-UVD and battery-charge current regulation modes of operation and their transient transition. The simulation result demonstrates a mode transition from the input-voltage regulation mode to the normal battery-charge current regulation mode in which the charge-current set-point reference is reduced from above 55 A to about 50 A at around time t=5.01 s. This causes the battery current to drop from 53.5 A to 50 A (on the lower plot of FIG. 15), and the distributed sourcing voltages V1, V2, and V3 to increase from 32.17 V to 40.6 V (on the upper plot of FIG. 15). During both modes of operation in steady state and their transient mode transitions, the three distributed sourcing voltages V1, V2, and V3 across the individual inputs of three respective converters are controlled to have uniform distribution at all times, as shown in three overlapping traces on the upper plot. It should be appreciated that the MPT controller is active during the input-voltage regulation mode. This allows all the sourcing voltages to contain a 20-Hz sinusoidal dither voltage $V_{DITHER}$ that provides a continuous perturbation to all sourcing voltages and subsequently produces a 20-Hz response that is superimposed on the total system battery bus current signal $I_{BUS}$.

FIG. 15 shows that the 20-Hz frequency component within total system battery bus current signal $I_{BUS}$ is extracted and processed by the MPT controller to update the set point reference voltage signal $V_{SP}$. The commanding set point voltage signal $V_{SPT}$, including set point reference voltage signal $V_{SP}$ and a small-amplitude dither voltage signal $V_{DITHER}$, serves as the commanding voltage signal for regulation of the feedback voltage $V_{DIS}$. In one embodiment, $V_{DIS}$ is the maximum-limit distribution reference as shown in FIG. 10 and FIG. 12.

Figure 16:
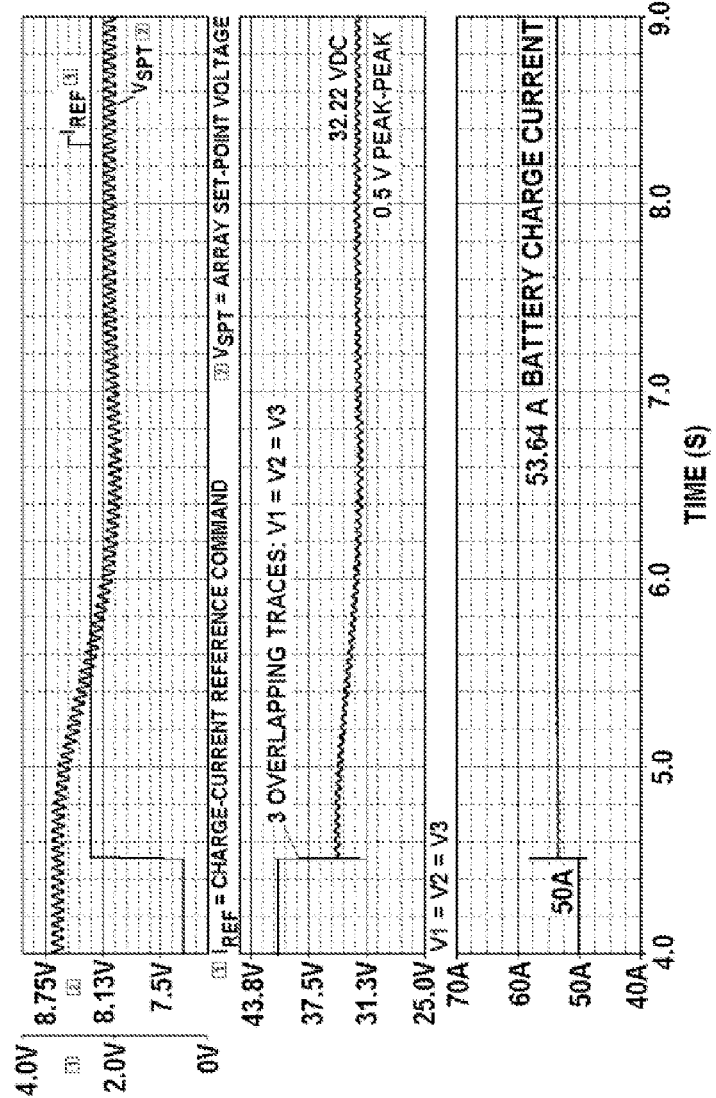
FIG. 16 illustrates another graph for a simulated response of the battery dominated power system shown in FIG. 6, according to an embodiment of the present invention.

FIG. 16 illustrates a graph 1600 for a simulated response of the battery dominated power system 600 shown in FIG. 6, according to an embodiment of the present invention. In FIG. 16, graph 1600 shows a simulated response of the battery dominated power system 600 during a transition from battery-charge current regulation to GT-UVD input voltage modes of operation.

For example, the simulation result reveals a transition from the battery charge current regulation mode to the input voltage regulation mode. Three sourcing input voltages V1, V2, and V3 shown in the middle plot are all regulated at a commanding set point voltage signal $V_{SPT}$, i.e., autonomously updated to approach a voltage corresponding to the system peak power voltage of 32.22 V with 0.5 V peak-to-peak dither voltage ripple. The change in the operation mode occurs as a result of a step-change in the commanding charge-current reference signal from 0.5 V (corresponding to 50-A charge-current) to 2.5 V (corresponding to 250-A charge current) as shown in the top plot of FIG. 16. The increased charger command causes diode D shown in FIG. 7 to be reverse-biased since the input voltage regulator 706 has entered its active linear region to prevent the system input voltages V1, V2, and V3 from collapsing below their existing commanding set point voltage $V_{SPT}$. The maximum power tracking operation (e.g., MPT controller 704) takes over the battery charge current regulation because the system peak power is still not able to provide enough current for charging the battery at the higher commanding charge-current reference level. Consequently, the battery current is saturated at 53.64 A as shown in the bottom plot of FIG. 16.

Figure 17:
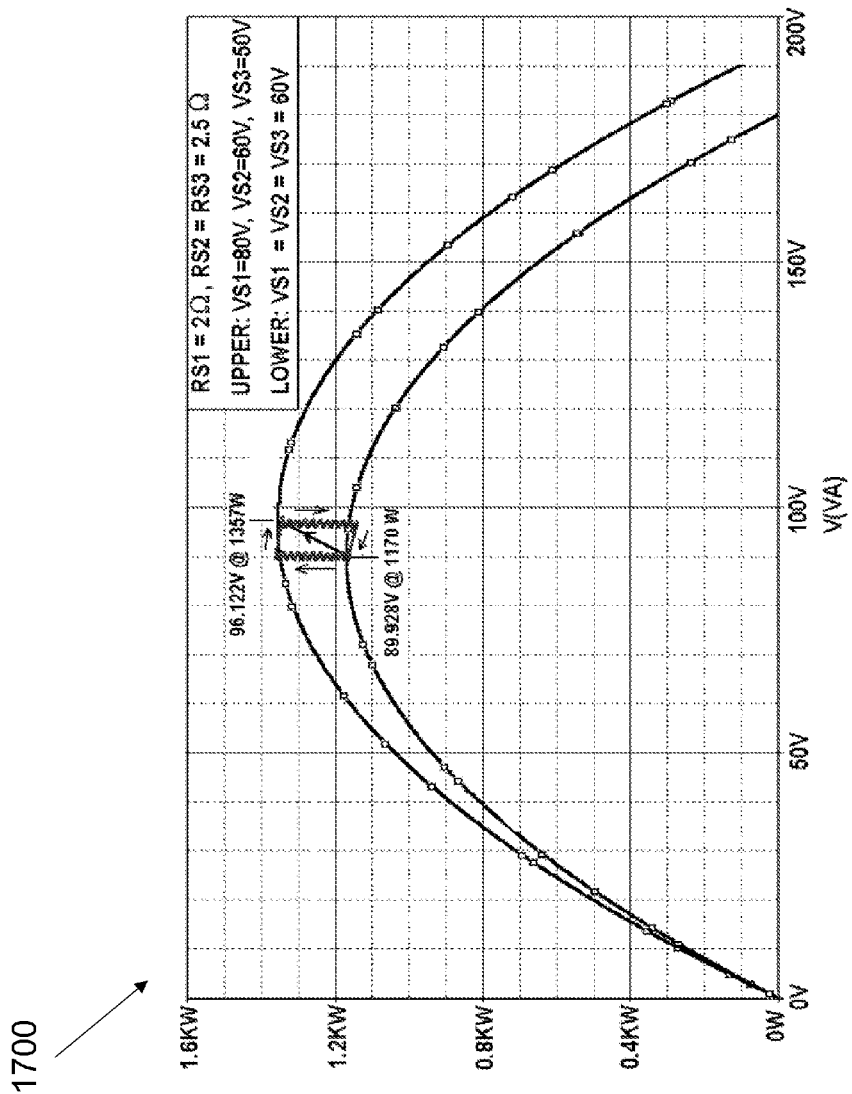
FIG. 17 illustrates an anticipated response of a DIPO power system with a single MPT controller, according to an embodiment of the present invention.

FIG. 17 illustrates an anticipated response of the DIPO power system with a single MPT controller, according to an embodiment of the present invention. In FIG. 17, power sources PS#1, PS#2, and PS#3 have open-circuit voltages of 60 VDC and sourcing resistances of 2.0 Ω, 2.5Ω, and 2.5Ω, respectively. To verify UVD control of the three distributed sourcing input voltages V1, V2, and V3, the open-circuit voltages of PS#1 and PS#3 are changed from 60 V to 80 V and 50 V, respectively, to cause the total sourcing peak power to increase from 1170 W to 1357 W.

Graph 1700 shows a possible transition from a lower peak power to a higher peak power due to changes in I-V characteristics of two power sources among three power sources controlled by three DIPO converters 604A, 604B, and 604C, as shown in FIG. 6. It should be noted that in this embodiment, when the three sources have identical open-circuit voltages of 60 VDC, the total peak-power voltage is 89.928 V, or 29.976 V per power source, and the total peak power is 1170 W, as shown in the lower curve. When the open-circuit voltages of power sources PS#1 and PS#3 are respectively changed to 80 V and 50 V, the total peak-power voltage becomes 96.122 V, or 32.04 V per power source, and the delivered peak power is 1357 W, as shown in the upper curve. Therefore, the peak power voltage per power source changes from 29.976 V to 32.04 V with the MPT controller enabled.

Graph 1700 illustrates that DIPO converters 604A, 604B, and 604C in FIG. 6 can have their outputs connected in parallel across a battery that exhibits very low impedance, such that the output current $I_{BUS}$ may be proportional to the sum of powers delivered by PS#1, PS#2, and PS#3. A delta change in the net output current $\Delta I_{BUS}$ delivered by the DIPO converters 604A, 604B, and 604C reflects a delta change in the total power delivered by the three power sources $\Delta P_{SOURCE}$. Superimposing a small AC dither voltage onto the uniformly controlled converter input voltage $\Delta V_1$ results in an AC output current signal $\Delta I_{BUS}$ having three possible phase responses: (1) $\Delta I_{BUS}$ and $\Delta V_1$ are in-phase when the DC operating voltage across the distributed converter input V1 is below the peak-power voltage; (2) $\Delta I_{BUS}$ and $\Delta V_1$ are 180° out of phase when V1 has its DC voltage above the peak-power voltage; and (3) $\Delta I_{BUS}$ and $\Delta V_1$ are 90° out of phase when V1 is at the peak-power voltage.

Graph 1700 further illustrates how MPT controller 704 in FIG. 7 can compare the two AC signals, $\Delta V_1$ and $\Delta I_{BUS}$, and slowly update the set-point reference voltage signal $V_{SP}$. Set-point reference voltage signal $V_{SP}$ commands input voltage regulator 706 to exert a control voltage $V_C$ in order to regulate the distributed-input voltage V1 near the peak power voltage.

Figure 18:
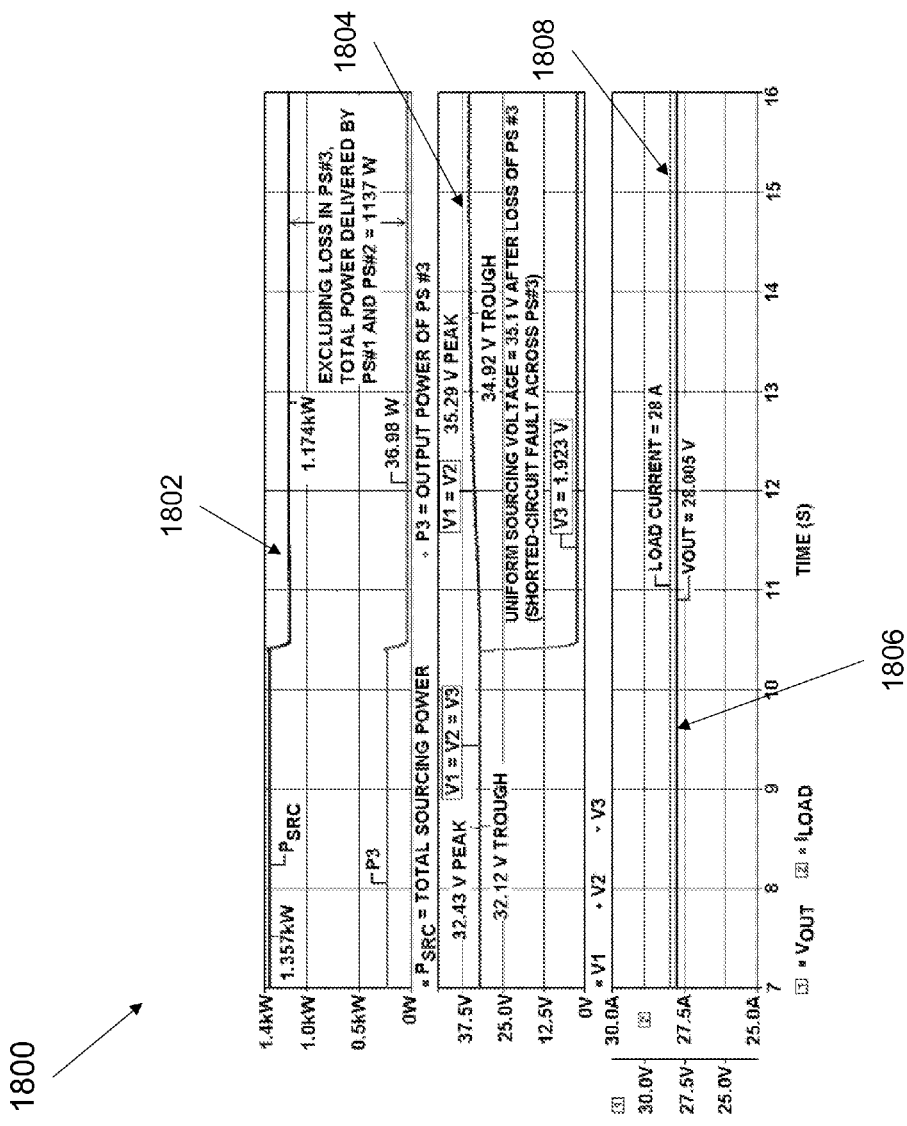
FIG. 18 illustrates a graph for a simulated response of the distributed source voltages, according to an embodiment of the present invention.

FIG. 18 illustrates a graph 1800 for a simulated response of the distributed source voltages, according to an embodiment of the present invention shown in FIG. 11. Graph 1800 shows another set of simulated responses of the total sourcing power $P_{SRC}$, the system output bus voltage $V_{OUT}$, the distributed input voltages V1, V2, and V3, and the load current drawn from the bus voltage as power source PS#3 experiences a short-circuit fault across its terminals, leading to nearly zero voltage across the input of converter #3, V3=1.923 V, at time t=10.4 s.

The voltage loss across power source PS#3 causes the system optimum sourcing power 1802 to drop from 1357 W to 1137 W and the two remaining distributed peak-power voltages V1 and V2 to increase from 32.275 V to 35.105 V (the middle plot, 1804). The system output voltage across $V_{OUT}$ and ground (the trace on the bottom plot, 1806) is well regulated at 28 VDC at all times despite the reduction in the total system peak power since the load power of 784 W at load current of 28 A (the trace on the bottom plot, 1808) is still significantly below the reduced system peak power of 1137 W. The single MPT controller, while maintaining the tracking of the peak-power voltage without loss of UVD control, also regulates the AC ripple voltage superimposed on the operating peak-power voltage.

Figure 19:
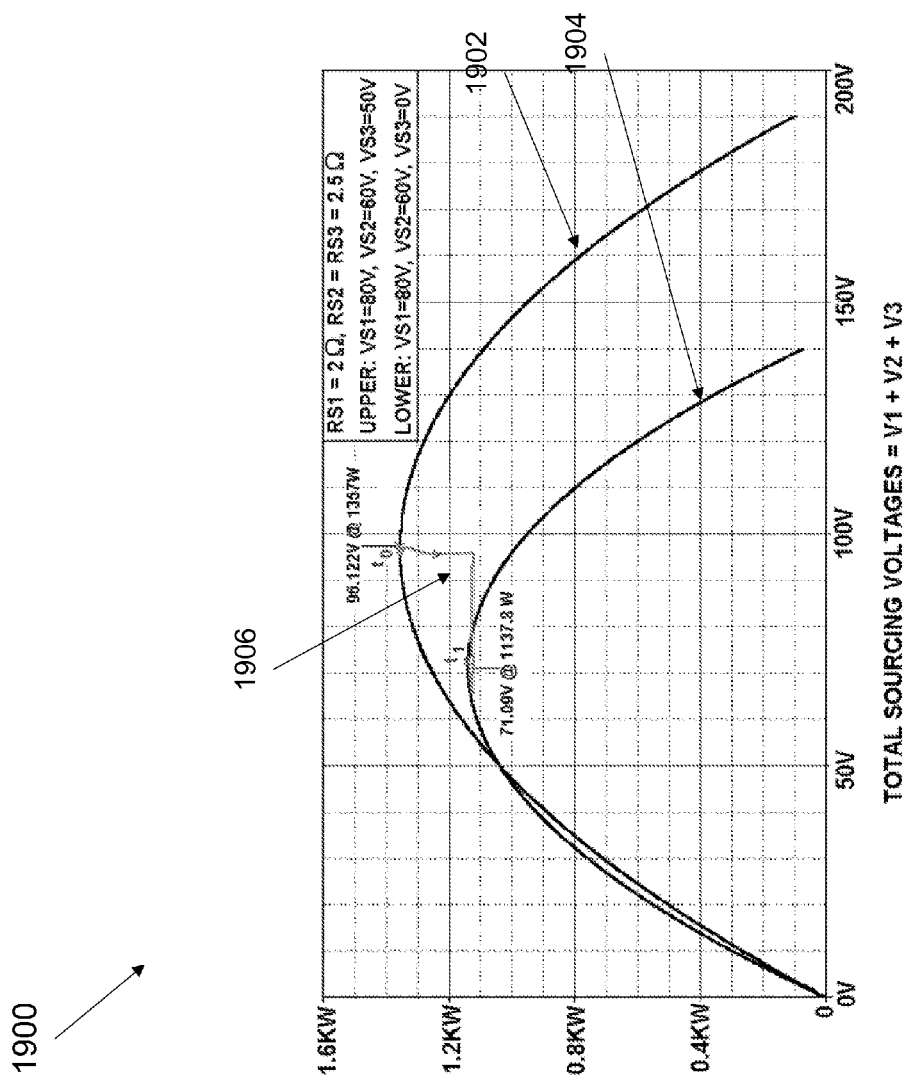
FIG. 19 illustrates a graph that shows a simulated power to voltage (P-V) trajectory of the total delivered power as a function of the total sourcing voltage for the power system shown in FIG. 11, according to an embodiment of the present invention.

FIG. 19 illustrates a graph 1900 that shows a simulated P-V trajectory of the total delivered power as a function of the total sourcing voltage for the power system shown in FIG. 11, according to an embodiment of the present invention. Graph 1900 overlays a trajectory of total sourcing power versus total sum of three distributed sourcing voltages (or the P-V trajectory) on two P-V static characteristics. Upper static parabolic trajectory 1902 belongs to three functional power sources PS#1, PS#2, and PS#3 and lower static parabolic trajectory 1904 belongs to two functional power sources (PS#1 and PS#2). In this embodiment, simulated P-V trajectory 1906 is extracted from the same time-domain simulation results shown in FIG. 18, uncovering the change in the system peak power from 1357 W at starting time $t_0$ to 1137.8 W at final time $t_1$. Graph 1900 shows that the two power levels are very close to their respective peak power points on the two P-V characteristics.

One or more embodiments of the present invention pertain to an apparatus that is configured to provide optimum power tracking for distributed power sources. The apparatus includes a plurality of distributed-input parallel-output converters, where each converter is operably connected to a corresponding power source. The apparatus further includes a controller that is operably connected to the plurality of converters, and is configured to provide uniform input voltages across each power source while tracking an optimum power point.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
a plurality of distributed-input parallel-output converters, each of the plurality of distributed-input parallel-output converters operably connected to a corresponding power source; and
a controller external to each of the plurality of distributed-input parallel-output converters and connected to each of the plurality of distributed-input parallel-output converters, wherein
the controller is further configured to receive a plurality of feedback input signals from each corresponding power source, and transmit a voltage control signal to each of the plurality of distributed-input parallel-output converters when one of the corresponding power sources experiences a reduction in power, such that uniform input voltages across each power source is achieved while tracking an optimum power point of each power source.

2. The apparatus of claim 1, wherein the controller comprises:
a battery charge controller configured to regulate a battery bus voltage signal to a preset value based on a voltage-temperature profile to prevent overcharging of a battery.

3. The apparatus of claim 1, wherein the controller further comprises:
a maximum power tracking controller configured to generate a commanding set point reference voltage signal, wherein the commanding set point reference voltage signal comprises a set point reference voltage signal and an AC dither voltage signal.

4. The apparatus of claim 3, wherein the maximum power tracking controller is further configured to process a total system bus current signal and an AC dither voltage signal to generate the commanding set point voltage signal, wherein the total system bus current is a total output current delivered from the plurality of distributed-input parallel-output converters.

5. The apparatus of claim 1, wherein the controller further comprises an input voltage regulator configured to generate a system control voltage signal based on a commanding set point voltage signal and a maximum limit voltage signal, wherein the maximum limit voltage signal corresponds to a highest voltage among input voltages from each respective power source.

6. The apparatus of claim 1, wherein the controller further comprises a uniform voltage distribution controller configured to generate a distributed control voltage for each distributed-input parallel-output converter such that optimum power is maintained across each power source.

7. The apparatus of claim 6, wherein the uniform voltage distribution controller comprises:
an input voltage distribution controller configured to generate a secondary voltage control signal for each distributed-input parallel-output converter based on a common distributed voltage reference signal and input voltages obtained from each of the plurality of distributed-input parallel-output converters.

8. The apparatus of claim 6, wherein the uniform voltage distribution controller comprises:
a fault tolerant input voltage distribution controller configured to generate a secondary voltage control signal for each distributed-input parallel-output converter based on a highest voltage, wherein the highest voltage is determined based on an input voltage from each of the plurality of distributed-input parallel-output converters.

9. The apparatus of claim 1, wherein the controller is further configured to receive a plurality of feedback input signals from each corresponding power source, and transmit the voltage control signal to one of the plurality of distributed-input parallel-output converters, which is connected to the corresponding power source experiencing a reduction in power.

10. The apparatus of claim 9, wherein the reduction of power comprises when one or more of the corresponding power sources loses input power, or when an operation mode other than a maximum power tracking mode controls the plurality of distributed-input parallel-output converters.

11. An apparatus, comprising:
a system controller external to each of a plurality of distributed-input parallel-output converters, and configured to receive a plurality of feedback input signals from each corresponding power source, and transmit a voltage control signal to each of the plurality of distributed-input parallel-output converters when one of the corresponding power sources experiences a reduction in power such that uniform input voltages across each power source is achieved while tracking an optimum power point of each power source.

12. The apparatus of claim 11, wherein each of the distributed-input parallel-output converters is operably connected to a corresponding power source.

13. The apparatus of claim 11, wherein the system controller is further configured to apply the voltage control signal to regulate input voltages across each of the plurality of distributed-input parallel-output converters during a reduction in power by at least one of the power sources.

14. The apparatus of claim 11, wherein the system controller comprises a maximum power tracking controller configured to receive a signal feedback signal to search for peak power voltage.

15. The apparatus of claim 14, wherein the maximum power tracking controller is further configured to generate a commanding set point reference voltage signal comprising a set point reference voltage signal and an AC dither voltage signal to regulate a common distribution voltage reference signal.

16. The apparatus of claim 11, wherein the system controller comprises an input voltage regulator configured to generate a system control voltage signal based on a commanding set point reference voltage signal and a common distribution voltage reference signal, and the common distribution voltage reference signal is a maximum voltage detected from input voltages across each of the plurality of power sources.

17. The apparatus of claim 11, wherein the system controller comprises a uniform voltage distribution controller configured to generate distributed control voltages for each distributed-input parallel-output converter such that optimum power is maintained across each power source.

18. A system controller, comprising:
a uniform voltage distribution controller external to each of a plurality of distributed-input parallel-output converters, and configured to process a system control voltage and generate distributed control voltages that are applied across each of the plurality of distributed-input parallel-output converters such that uniform input voltage is achieved across each of a plurality of respective power sources, wherein
the uniform voltage distribution controller is and is further configured to receive a plurality of feedback input signals from each corresponding power source and transmit a voltage control signal to each of the plurality of distributed-input parallel-output converters when one of the corresponding power sources experiences a reduction in power, such that uniform input voltages across each power source is achieved while tracking an optimum power point of each power source.

19. The system controller of claim 18, further comprising:
a battery charge controller configured to regulate a battery bus voltage signal to a preset value based on a voltage-temperature profile to prevent overcharging of a battery.

20. The system controller of claim 18, further comprising:
a maximum power tracking controller configured to generate a commanding set point reference voltage signal to regulate a common distribution voltage reference signal, wherein the commanding set point reference voltage signal comprises a set point reference voltage signal and an AC dither voltage signal, wherein the common distribution voltage reference signal corresponds to a highest voltage among input voltages obtained from each respective power source.

21. The system controller of claim 18, further comprising:
an input voltage regulator configured to generate a system control voltage signal based on a commanding set point reference voltage signal and a common distribution voltage reference signal.

22. The system controller of claim 18, wherein the uniform voltage distribution controller is further configured to subtract secondary voltage control signals from a system control voltage signal to generate the distributed control voltages for each distributed-input parallel-output converter.

* * * * *